United States Patent
Ma et al.

(10) Patent No.: US 10,509,152 B2
(45) Date of Patent: Dec. 17, 2019

(54) LIGHT GUIDE PLATE, BACKLIGHT MODULE AND DISPLAY DEVICE

(71) Applicant: BOE TECHNOLOGY GROUP CO., LTD., Beijing (CN)

(72) Inventors: Yongda Ma, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/743,655

(22) PCT Filed: Jun. 9, 2017

(86) PCT No.: PCT/CN2017/087643
§ 371 (c)(1),
(2) Date: Jan. 10, 2018

(87) PCT Pub. No.: WO2018/019033
PCT Pub. Date: Feb. 1, 2018

(65) Prior Publication Data
US 2019/0025493 A1 Jan. 24, 2019

(30) Foreign Application Priority Data
Jul. 29, 2016 (CN) ............ 2016 2 0820048 U

(51) Int. Cl.
*F21V 7/04* (2006.01)
*F21V 8/00* (2006.01)

(52) U.S. Cl.
CPC ........... *G02B 6/0018* (2013.01); *G02B 6/002* (2013.01)

(58) Field of Classification Search
CPC ........ G02B 6/0018; G02B 6/00; G02B 6/002; F21S 8/00
(Continued)

(56) References Cited

U.S. PATENT DOCUMENTS

2011/0286238 A1* 11/2011 Kurata ................. G02B 6/0021
362/606
2012/0182756 A1 7/2012 Chang
(Continued)

FOREIGN PATENT DOCUMENTS

CN 201035175 Y 3/2008
CN 102563541 A 7/2012
(Continued)

OTHER PUBLICATIONS

International Search Report received for PCT Patent Application No. PCT/CN2017/087643, dated Sep. 11, 2017, 7 pages (3 pages of English Translation and 7 pages of Original Document).

*Primary Examiner* — Matthew J. Peerce
(74) *Attorney, Agent, or Firm* — Womble Bond Dickinson (US) LLP

(57) ABSTRACT

A light guide plate includes a first light emitting surface and a second light emitting surface. The first light emitting surface and the second light emitting surface are connected by an inclined surface. The first light emitting surface is connected to the light incident surface of the light guide plate and is higher than the second light emitting surface, and the inclined surface is provided with a protruding structure. According to the technical solutions in the embodiments of the present disclosure, part of the light projected onto the inclined surface is reflected back to the light guide plate by the protruding structure and reflected back and forth between the bottom surface of the light guide plate and the inclined surface to be sufficiently mixed and homogenized. A part of the homogenized light emits from the second light emitting surface to compensate for a longitudinal brightness difference. Another part of the homogenized light exits from the protruding structure on the inclined surface and the first light emitting surface, thereby reducing the transverse brightness difference. Thus, the poor
(Continued)

user experience such as dazzling can be reduced and the viewing effect can be improved.

19 Claims, 5 Drawing Sheets

(58) Field of Classification Search
USPC .......................................................... 362/621
See application file for complete search history.

(56) References Cited

U.S. PATENT DOCUMENTS

| | | |
|---|---|---|
| 2013/0044514 A1 | 2/2013 | Chang et al. |
| 2013/0208506 A1 | 8/2013 | Ye et al. |
| 2013/0242614 A1 | 9/2013 | Kurata et al. |

FOREIGN PATENT DOCUMENTS

| | | |
|---|---|---|
| CN | 103244869 A | 8/2013 |
| CN | 103308973 A | 9/2013 |
| CN | 206002713 U | 3/2017 |

\* cited by examiner

US 10,509,152 B2

LIGHT GUIDE PLATE, BACKLIGHT MODULE AND DISPLAY DEVICE

RELATED APPLICATION

This application is the U.S. national phase entry of PCT/CN2017/087643 with an International filing date of Jun. 9, 2017, which claims the benefit of Chinese Patent Application No. 201620820048.1, filed on Jul. 29, 2016, the entire content of which is incorporated herein by reference.

FIELD OF THE DISCLOSURE

The disclosure relates to a technical field of display, and in particular, to a light guide plate, a backlight module and a display device.

BACKGROUND OF THE DISCLOSURE

For the side incident type light guide plate, in the following, for the sake of description, we will call an area of the light guide plate close to the light incident surface as the near-light area, and the area far from the light incident surface as the far-light area.

If an incident light source of a side incident type light guide plate is sequentially arranged at a side of the light incident surface of the light guide plate along a length direction of the light incident surface of the light guide plate in the form of a plurality of discrete light sources, the brightness of the light emitted from the near-light area is higher than that from the far-light area. For the convenience of description, the brightness difference due to the different distances from the light incident surface is hereinafter referred to as a longitudinal brightness difference.

In addition, in a length direction (transverse direction) of the light incident surface of the light guide plate, the light emitted from the light emitting surface portions aligned with or corresponding to the positions of the light sources is generally bright, and the light emitted from the light emitting surface portions deviated from the positions of the light sources is generally dark. For instance, the light emitted from the portion corresponding to the midpoint between two adjacent light sources is generally the darkest. For the convenience of description, the brightness difference due to the various deviation degree from the light sources in the transverse direction is hereinafter referred to as the transverse brightness difference.

In general, the transverse brightness difference in the near-light area is greater than that in the far-light area. In order to reduce the transverse brightness difference in the near-light area, there is a precedent in the art, in which the aim is achieved by reducing the pitch of the light sources so as to increase the distribution density of the light sources. However, this method increases the number of light sources per unit area, adding extra cost. And this method cannot alleviate the problem of longitudinal brightness difference.

SUMMARY OF THE DISCLOSURE

The technical problem to be solved by the present disclosure is to provide a light guide plate capable of simultaneously reducing the transverse brightness difference and the longitudinal brightness difference of light emitted by a light guide plate without increasing the light source distribution density.

To this end, the light guide plate proposed in the present disclosure comprises: a first light emitting surface and a second light emitting surface, wherein, the first light-emitting surface and the second light-emitting surface are connected by an inclined surface;

the first light emitting surface is connected to the light incident surface and higher than the second light emitting surface;

the inclined surface is provided with a protruding structure.

Optionally, the protruding structure comprises a plurality of sub-protruding structures, each sub-protruding structure comprises a sub-curved surface for partially reflecting the light emitted from the inclined surface, the generatrix of the sub-curved surface is parallel to the inclined surface.

Optionally, the distribution density of the sub-protruding structures corresponding to the area (or position) of the light source is higher than the distribution density of the sub-protruding structures corresponding to the area between the light sources.

Optionally, a cross-section of the sub-protruding structure in a direction perpendicular to the generatrix is triangular or polygonal.

Optionally, a cross-section of the sub-protruding structure in a direction perpendicular to the generatrix is semicircular or semi-elliptical.

Optionally, the plurality of sub-curved surfaces have the same size and/or shape.

Optionally, an upper surface of the protruding structure is in the same plane as the first light emitting surface.

Optionally, the inclined surface is a curved surface. The distance from a local area of the inclined surface to the light incident surface is directly proportional to the light flux received by the light incident surface corresponding to the local area of the inclined surface.

The present disclosure also provides a backlight module, comprising the light guide plate described above.

The present disclosure also provides a display device, comprising the backlight module described above.

According to the technical solutions in the above embodiments of the present disclosure, part of the light emitted from the inclined surface is reflected back to the light guide plate by the protruding structure and reflected back and forth between the bottom surface of the light guide plate and the inclined surface to be sufficiently mixed and homogenized. A part of the homogenized light emits from the second light emitting surface to compensate for the longitudinal brightness difference. Another part of the homogenized light exits from the protruding structure on the inclined surface and the first light emitting surface, thereby reducing the transverse brightness difference. Thus, the poor user experience such as dazzling can be reduced and the viewing effect can be improved.

BRIEF DESCRIPTION OF THE DRAWINGS

The features and advantages of the present disclosure will be more clearly understood by reference to the following drawings, which are intended to be illustrative and not to be construed as limiting the present disclosure in any way whatsoever, wherein.

DETAILED DESCRIPTION OF THE DISCLOSURE

In order to more clearly understand the above objects, features and advantages of the present disclosure, the disclosure will be further described in detail below with reference to the accompanying drawings and specific embodiments. It should be noted that, in the case of no conflict, the embodiments of the present application and the features in the embodiments can be combined with each other.

In the following description, numerous specific details are set forth in order to provide a thorough understanding of the present disclosure. However, the present disclosure can also be implemented in other ways than the ones described herein. Therefore, the protection scope of the present disclosure is not limited to the specific embodiments disclosed below.

Figure 1:
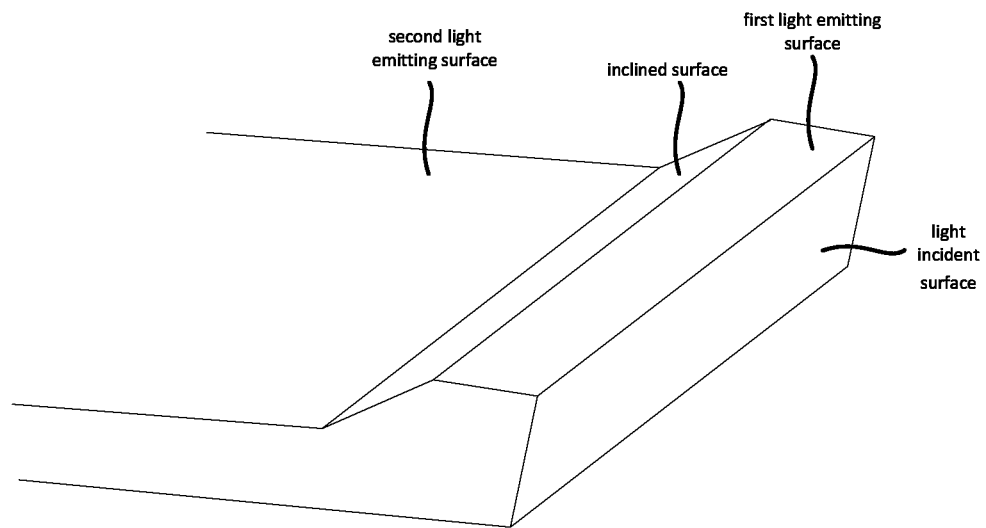
FIG. 1 is a schematic view of a light guide plate according to a first embodiment of the present disclosure.

For example, as shown in FIG. 1, according to an aspect of the present disclosure, the light incident surface of the light guide plate is thicker than the second light emitting surface (the main light emitting surface) to facilitate the incident light to sufficiently enter into the light guide plate. The first light emitting surface connected with the light incident surface is arranged higher than the second light emitting surface, and the higher first light emitting surface and the lower second light emitting surface are connected by an inclined surface. After the light enters the light guide plate from the light incident surface, most of the light will be emitted from the second light emitting surface after reflection or scatter by the bottom surface (usually provided with dots or reflective coating), but a small part of light will be emitted onto the inclined surface. In order to prevent the part of the light projected onto the inclined surface from being emitted directly from the inclined surface to cause excessive brightness difference of the emitting light, a half-reflective coating may be provided on the inclined surface to partially reflect the light projected on the inclined surface back into the light-guide plate and then the light will be reflected back and forth between the bottom surface of the light guide plate and the inclined surface, so as to be sufficiently mixed and homogenized. Part of the homogenized light emits from the second light-emitting surface, to compensate for the longitudinal brightness difference; another part of the homogenized light emits from the semi-reflective coating on the inclined surface and the first light emitting surface, thus reducing the transverse brightness difference. Thus, poor user experience such as dazzling can be reduced and the viewing effect can be improved.

Figure 2:
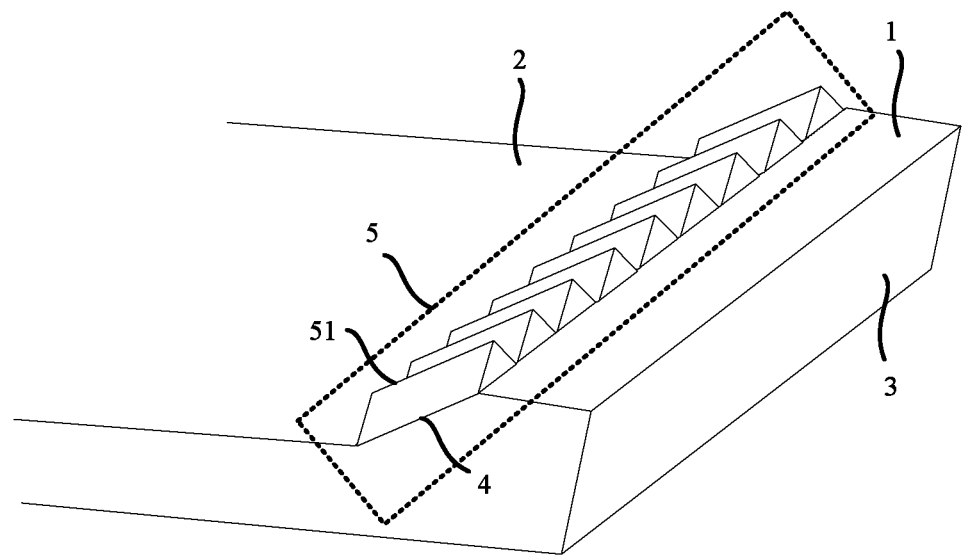
FIG. 2 is a schematic view of a light guide plate according to a second embodiment of the present disclosure.

As shown in FIG. 2, a light guide plate according to another embodiment of the present disclosure includes a first light emitting surface 1 and a second light emitting surface 2. The first light emitting surface 1 is connected to the light incident surface 3 of the light guide plate and is higher than the second light emitting surface 2, the first light-emitting surface 1 and the second light-emitting surface 2 are connected by an inclined surface 4, and the light guide plate further comprises: a protruding structure 5 arranged on the inclined surface 4, for example for reflecting part of the light emitted from the inclined surface 4 back to the light guide plate.

Figure 3:
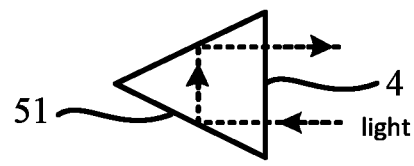
FIG. 3 is a schematic view of a sub-curved surface of the light guide plate shown in FIG. 2.

According to the present embodiment, part of the light emitted from the inclined surface 4 can be reflected back to the light guide plate by the protruding structure 5 as shown in FIG. 3, and reflected back and forth between the bottom surface of the light guide plate and the inclined surface 4 to be sufficiently mixed and homogenized. Part of the homogenized light emits from the second light-emitting surface 5 to compensate for the longitudinal brightness difference, and another part of the homogenized light exits from the protruding structure 5 on the inclined surface 4 and the first light-emitting surface 1, thereby reducing the transverse brightness difference. Thus, the poor user experience such as dazzling can be reduced and the viewing effect can be improved.

As shown in FIG. 2, as an alternative, the protruding structure 5 includes a plurality of sub-protruding structures 51. Each of the sub-protruding structures 51 includes a sub-curved surface for reflecting part of the light. A generatrix of the sub-curved surface is parallel to the inclined surface 4.

In the present embodiment, by designing the protruding structure as the plurality of sub-protruding structures 51 comprising a plurality of sub-curved surfaces, the light emitted from the inclined surface can be reflected. And since the generatrix of the sub-curved surface is parallel to the inclined surface, it is easy to form a curved surface that reflects the light emitted by the inclined surface back to the light-guiding plate.

Figure 4:
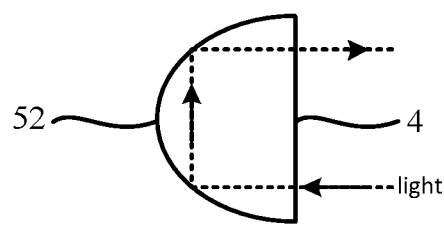
FIG. 4 is a schematic view of a sub-curved surface of a light guide plate according to a third embodiment of the present disclosure.

It should be noted that, the sub-protruding structure 51 shown in FIGS. 2 and 3 is a prismatic shape and this is merely an embodiment of the present disclosure. Actually, the shape of the protruding structure 51 can be designed as needed, for example, as shown in FIG. 4, the sub-protruding structure 52 is semi-cylindrical, as long as part of the light emitted from the inclined surface can be reflected back to the light guide plate.

As an alternative, the generatrix of the sub-curved surface is parallel to the inclined surface 4.

Figure 5:
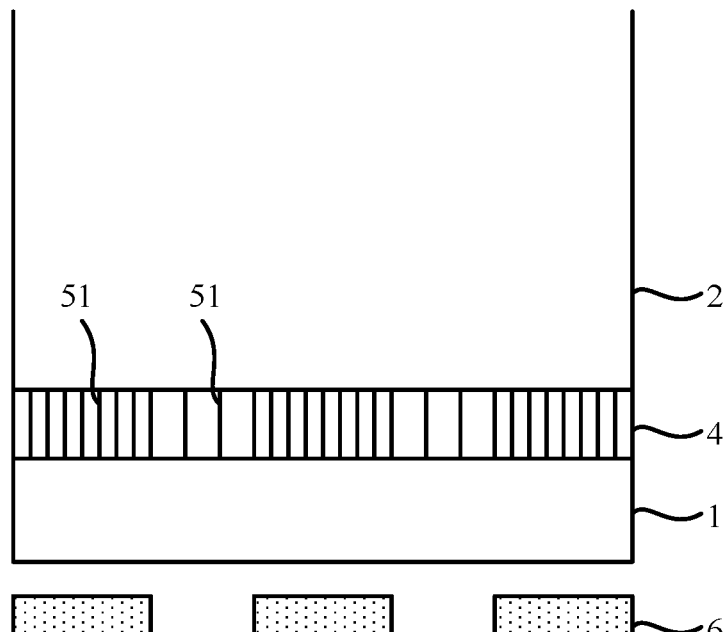
FIG. 5 is a schematic view of the density of sub-protruding structures according to an example of the present disclosure.

FIG. 5 is a top view of a backlight module including a light guide plate. The distribution density of the sub-protruding structures 51 corresponding to the area of the light sources 6 is higher than the distribution density of the sub-protruding structures 51 corresponding to the area between the light sources 6.

Figure 6:
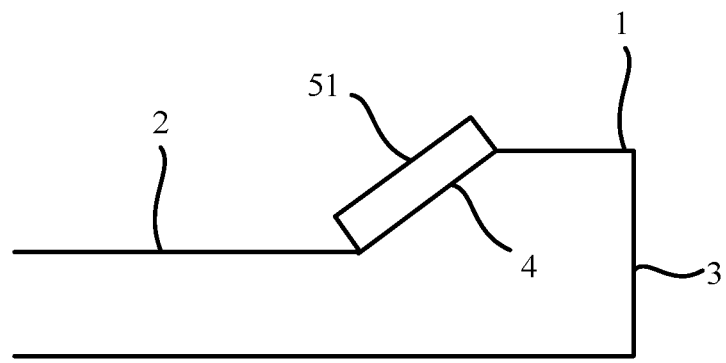
FIG. 6 is a schematic view showing the relationship between the sub-protruding structure and a second plane according to an example of the present disclosure.
Figure 7:
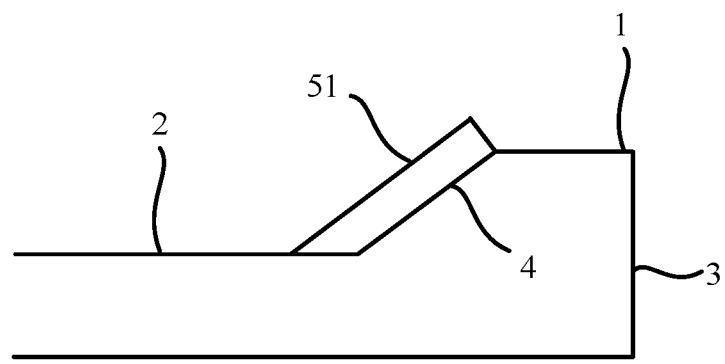
FIG. 7 is a schematic view showing the relationship between a sub-protruding structure and a second plane according to another example of the present disclosure.

In this embodiment, since the generatrix of the sub-curved surface is parallel to the inclined surface, the sub-protruding structure is easily arranged to be perpendicular to the inclined direction of the inclined surface. In this embodiment, for example, as shown in FIG. 6, the sub-protruding structure 51 may be in line contact with a second plane 2 (the contact area is a line) to reduce the influence of the sub-protruding structure 51 on the normal light emission of the second plane 2. As shown in FIG. 7, the sub-protruding structure 52 may be in surface contact with the second plane 2 (the contact area is a surface) to ensure that the light emitted from an end of the inclined surface 4 near the second plane 2 is reflected back to the light guide plate. FIGS. 6 and 7 are front views of the light guide plate.

According to the present embodiment, by setting the distribution density of the sub-protruding structures corresponding to the area of the light source 6 higher than the distribution density of the sub-protruding structures corresponding to the area between the light sources, it is possible to ensure that the protruding structure can reflect a larger proportion of the light emitted from the area of the inclined surface corresponding to the light source back to the light guide plate, reflect a smaller proportion of the light emitted from the area of the inclined surface corresponding to the area between the light sources back to the light guide plate, so as to further reduce the transverse brightness difference and improve the viewing effect.

Alternatively, the cross section of the sub-protruding structure 51 in a direction perpendicular to the generatrix is triangular and/or polygonal. Of course, it can also be semi-circular or semi-elliptical as shown in FIG. 4.

Figure 8:
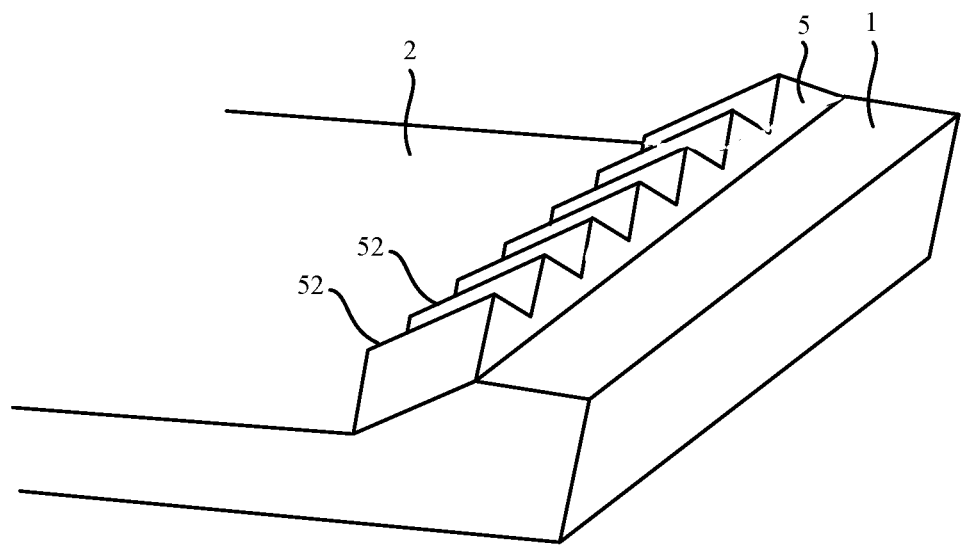
FIG. 8 is a schematic view of a light guide plate according to a fourth embodiment of the present disclosure.

As shown in FIG. 8, as an alternative, the protruding structure 5 includes a curved surface for reflecting part of the light, and the generatrix of the curved surface is parallel to the inclined surface 4.

In this embodiment, the protruding structure can be integrally formed with the inclined surface or separately manufactured and then assembled on the inclined surface. Because the generatrix of the curved surface is parallel to the inclined surface, it is easy to form a curved surface that reflects the light emitted by the inclined surface back to the light guide plate.

As an alternative, the curved surface includes a plurality of sub-curved surfaces 52 of the same shape and/or the same size.

By designing the curved surface to include multiple identical sub-curved surfaces, light emitted from the inclined surface can be reflected more uniformly.

Figure 9:
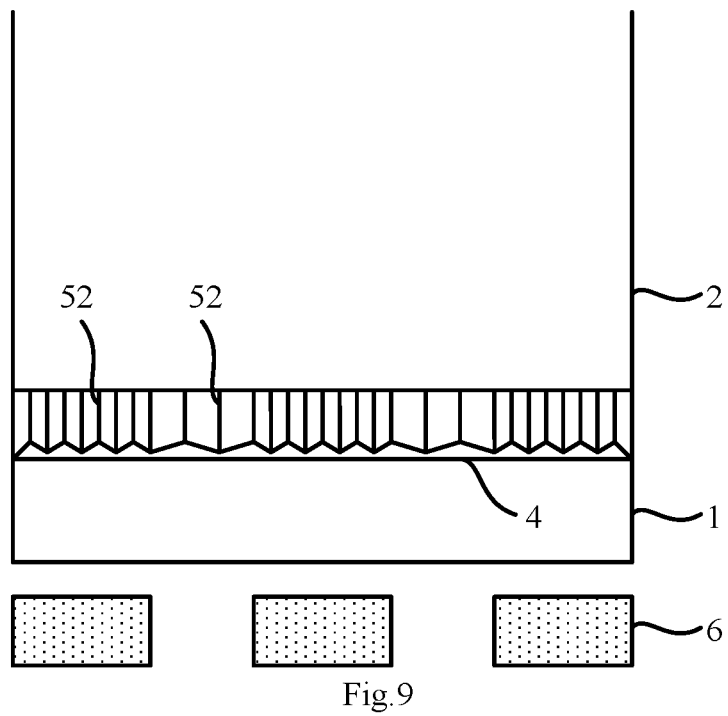
FIG. 9 is a schematic view of the density of sub-curved surfaces according to an example of the present disclosure.

FIG. 9 shows a top view of the light guide plate. As an alternative, the distribution density of the sub-curved surface 52 of the protruding structure 5 corresponding to the area of the light sources 6 is higher than the distribution density of the sub-curved surfaces 52 corresponding to the area between the light sources 6.

According to this embodiment, it can be ensured that the protruding structure can reflect a larger proportion of the light emitted from the area of the inclined surface corresponding to the area of the light source back to the light guide plate, reflect a smaller proportion of the light emitted from the area of the inclined surface corresponding to the area between the light sources back to the light guide plate, so as to further reduce the transverse brightness difference and improve the viewing effect.

Figure 10:
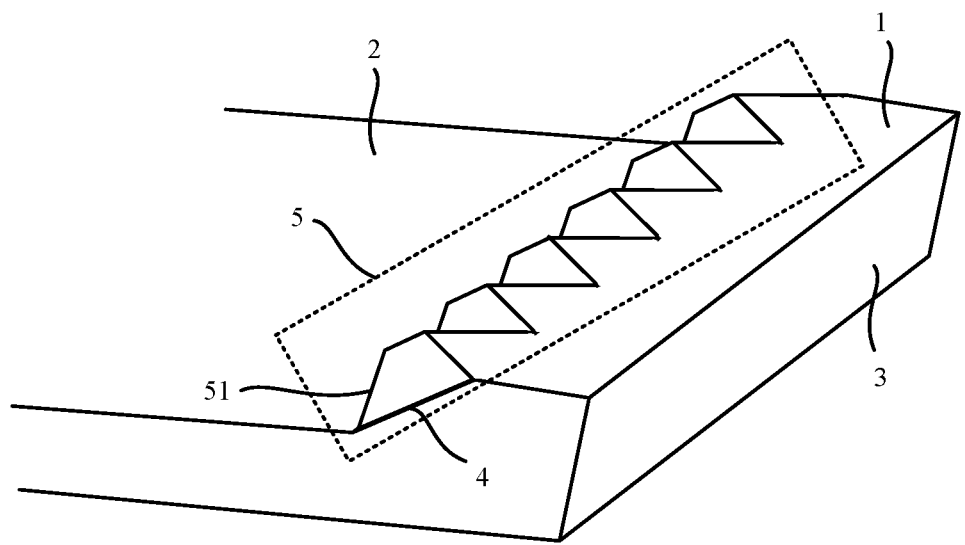
FIG. 10 is a schematic view of an upper surface of a protruding structure of a light guide plate according to a fifth embodiment of the present disclosure.

As shown in FIG. 10, as an alternative, the upper surface of the protruding structure 5 is located on the same plane as the first light-emitting surface 1.

According to the present embodiment, the protruding structure 51 is not higher than the first light-emitting surface, so that other optical elements may be mounted on the first light-emitting surface 1 or other optical layer structures may be provided on the first light-emitting surface 1.

Figure 11:
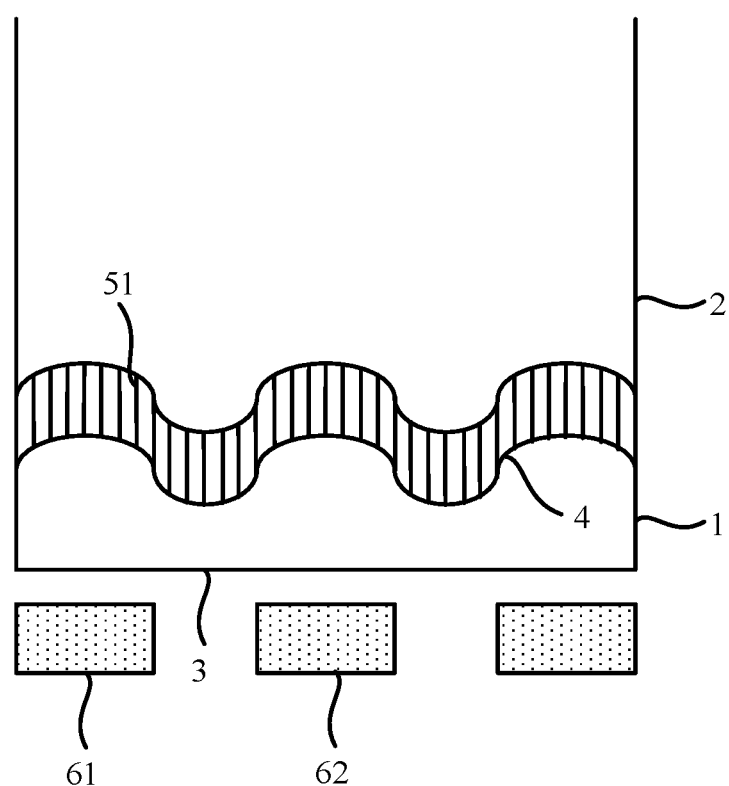
FIG. 11 is a schematic view of an inclined surface of a light guide plate according to a sixth embodiment of the present disclosure.

FIG. 11 is a top view of a light guide plate according to another embodiment, wherein the inclined surface 4 is a curved surface, the distance from a local area of the inclined surface 4 to the light incident surface 3 is directly proportional to the light flux received by the light incident surface corresponding to the local area of the inclined surface 4.

Taking the two light sources in FIG. 11 as an example, the first area of the inclined surface 4 facing the first light source 61 and the second area facing the second light source 62 are furthest away from the light incident surface 3, and a third area of the inclined surface 4 facing the midpoint between the light source 61 and the second light source 62 is closest to the light incident surface 3. In this way, the difference between the amount of light received by the first area or the second area and the amount of light received by the third area is reduced, so as to reduce the transverse brightness difference of the emitted light and improve the viewing effect.

The present disclosure further provides a backlight module, including the above described light guide plate.

The present disclosure further provides a display device comprising the above described backlight module.

It should be noted that the display device in this embodiment can be any product or component that has display function such as an electronic paper, a cell phone, a tablet, a television, a notebook computer, a digital photo frame, a navigator, and the like.

The technical solutions of the present disclosure are described in detail in the foregoing with reference to the accompanying drawings. In light of the prior art, due to the existence of a certain distance among the light sources, the amount of light emitted by the area corresponding to the light source is large, while the amount of light emitted by the area corresponding to the area between the light sources is small, so there is a brightness difference in the overall light output from the backlight source viewed by the user. According to the technical solutions of the embodiment of the present disclosure, part of the light emitted from the inclined surface is reflected back to the light guide plate by the protruding structure and reflected back and forth between the bottom surface of the light guide plate and the inclined surface, to be sufficiently mixed and homogenized. Part of the homogenized light exits from the second light emitting surface to compensate for the longitudinal brightness difference. Another part of the homogenized light exits from the protruding structure on the inclined surface and the first light emitting surface, thereby reducing the transverse brightness difference. Thus, the poor user experience such as dazzling can be reduced and the viewing effect can be improved.

In the present disclosure, the terms "first", "second", and "third" are used for descriptive purposes only and are not to be construed as indicating or implying relative importance. The term "plurality" refers to two or more, unless expressly limited otherwise.

The foregoing descriptions are merely exemplary embodiments of the present disclosure, and are not intended to limit the present disclosure. For those skilled in the art, the disclosure may have various modifications and variations. Any modification, equivalent replacement, improvement, etc. within the spirit and principle of the disclosure should be included in the protection scope of the disclosure.

The invention claimed is:

1. A light guide plate, comprising: a light incident surface, a first light exiting surface, an inclined surface and a second light exiting surface, wherein, the first light exiting surface and the second light exiting surface are connected by the inclined surface, the first light exiting surface is connected to the light incident surface and higher than the second light exiting surface, the inclined surface is provided with a protruding structure including a plurality of sub-protruding structures, the inclined surface is provided thereon with a half-reflective coating to partially, reflect light projected on the inclined surface back into the light guide plate, and a contact area between the protruding structure and the first light exiting surface is a straight line, a contact area between the protruding structure and the second light exiting surface is a straight line, wherein distribution density of the sub-protruding structures corresponding to a position of a light source is higher than a distribution density of the sub-protruding structures corresponding to an area between light sources.

2. The light guide plate according to claim 1, wherein each sub-protruding structure comprises a sub-curved surface for partially reflecting light exited from the inclined surface, the generatrix of the sub-curved surface is parallel to the inclined surface.

3. The light guide plate of claim 2, wherein a cross-section of the sub-protruding structure in a direction perpendicular to the generatrix is triangular or polygonal.

4. The light guide plate of claim 2, wherein a cross-section of the sub-protruding structure in a direction perpendicular to the generatrix is semicircular or semi-elliptical.

5. The light guide plate of claim 2, wherein the plurality of sub-curved surfaces have the same size and/or shape.

6. The light guide plate according to claim 1, wherein an upper surface of the protruding structure is flush with the first light exiting surface.

7. The light guide plate according to claim 1, wherein the inclined surface is a curved surface, and wherein a distance from a local area of the inclined surface to the light incident surface is directly proportional to a light flux received by the light incident surface corresponding to the local area of the inclined surface.

8. A backlight module, comprising the light guide plate according to claim 1.

9. A display device, comprising the backlight module of claim 8.

10. The light guide plate according to claim 2, wherein an upper surface of the protruding structure is flush with the first light exiting surface.

11. The light guide plate according to claim 1, wherein an upper surface of the protruding structure is flush with the first light exiting surface.

12. The light guide plate according to claim 3, wherein an upper surface of the protruding structure is flush with the first light exiting surface.

13. The light guide plate according to claim 4, wherein an upper surface of the protruding structure is flush with the first light exiting surface.

14. The light guide plate according to claim 5, wherein an upper surface of the protruding structure is flush with the first light exiting surface.

15. The light guide plate according to claim 2, wherein the inclined surface is a curved surface, and wherein a distance from a local area of the inclined surface to the light incident surface is directly proportional to a light flux received by the light incident surface corresponding to the local area of the inclined surface.

16. The light guide plate according to claim 1, wherein the inclined surface is a curved surface, and wherein a distance from a local area of the inclined surface to the light incident surface is directly proportional to a light flux received by the light incident surface corresponding to the local area of the inclined surface.

17. The light guide plate according to claim 3, wherein the inclined surface is a curved surface, and wherein a distance from a local area of the inclined surface to the light incident surface is directly proportional to a light flux received by the light incident surface corresponding to the local area of the inclined surface.

18. The light guide plate according to claim 4, wherein the inclined surface is a curved surface, and wherein a distance from a local area of the inclined surface to the light incident surface is directly proportional to a light flux received by the light incident surface corresponding to the local area of the inclined surface.

19. The light guide plate according to claim 5, wherein the inclined surface is a curved surface, and wherein a distance from a local area of the inclined surface to the light incident surface is directly proportional to a light flux received by the light incident surface corresponding to the local area of the inclined surface.

* * * * *